Figure 10:
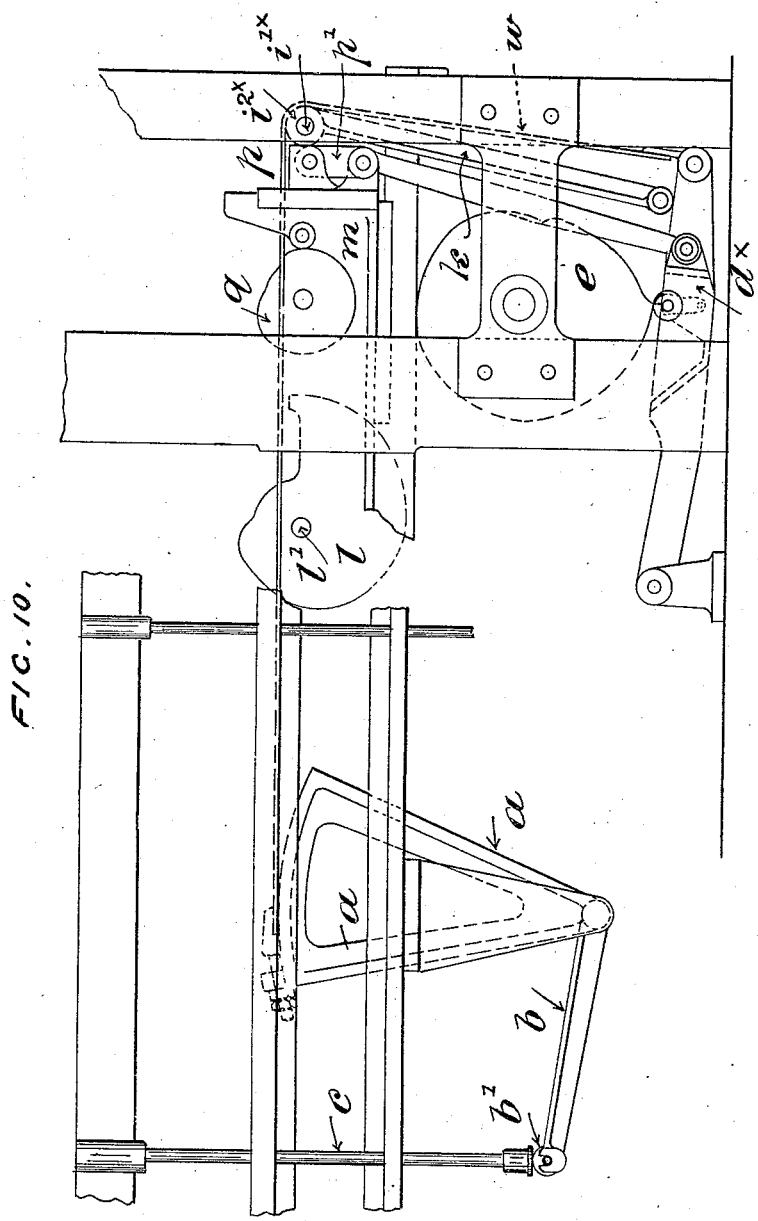

No. 842,921. PATENTED FEB. 5, 1907.
R. TODD & J. A. & A. H. STOTT.
MEANS FOR FACILITATING THE SPINNING OF TEXTILE FIBERS.
APPLICATION FILED FEB. 21, 1905.
7 SHEETS—SHEET 1.
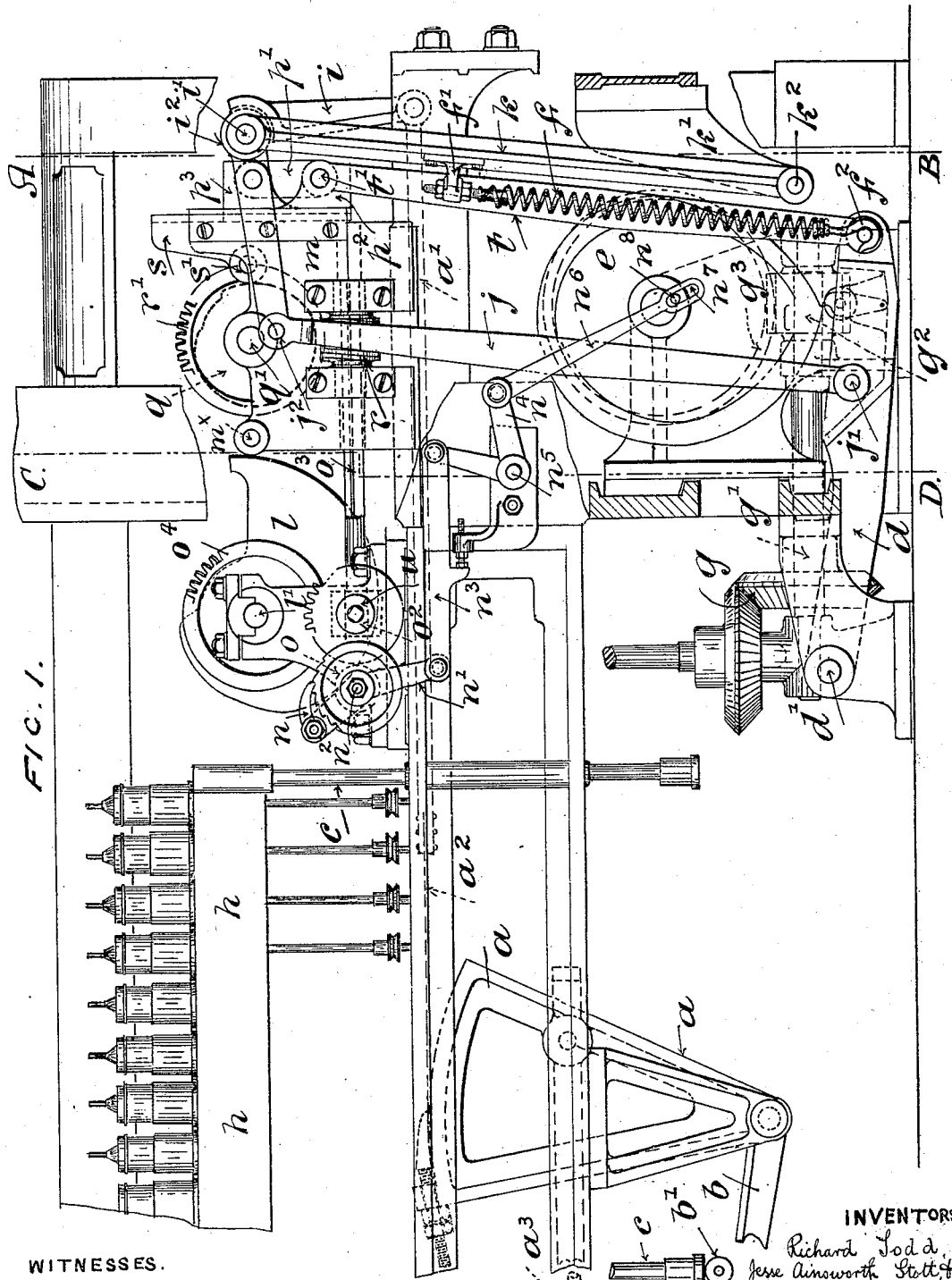
WITNESSES.
INVENTORS
Richard Todd
Jesse Ainsworth Stott
Abraham Henthorn Stott
By their Attorneys No. 842,921. PATENTED FEB. 5, 1907.
R. TODD & J. A. & A. H. STOTT.
MEANS FOR FACILITATING THE SPINNING OF TEXTILE FIBERS.
APPLICATION FILED FEB. 21, 1905.
7 SHEETS—SHEET 2.
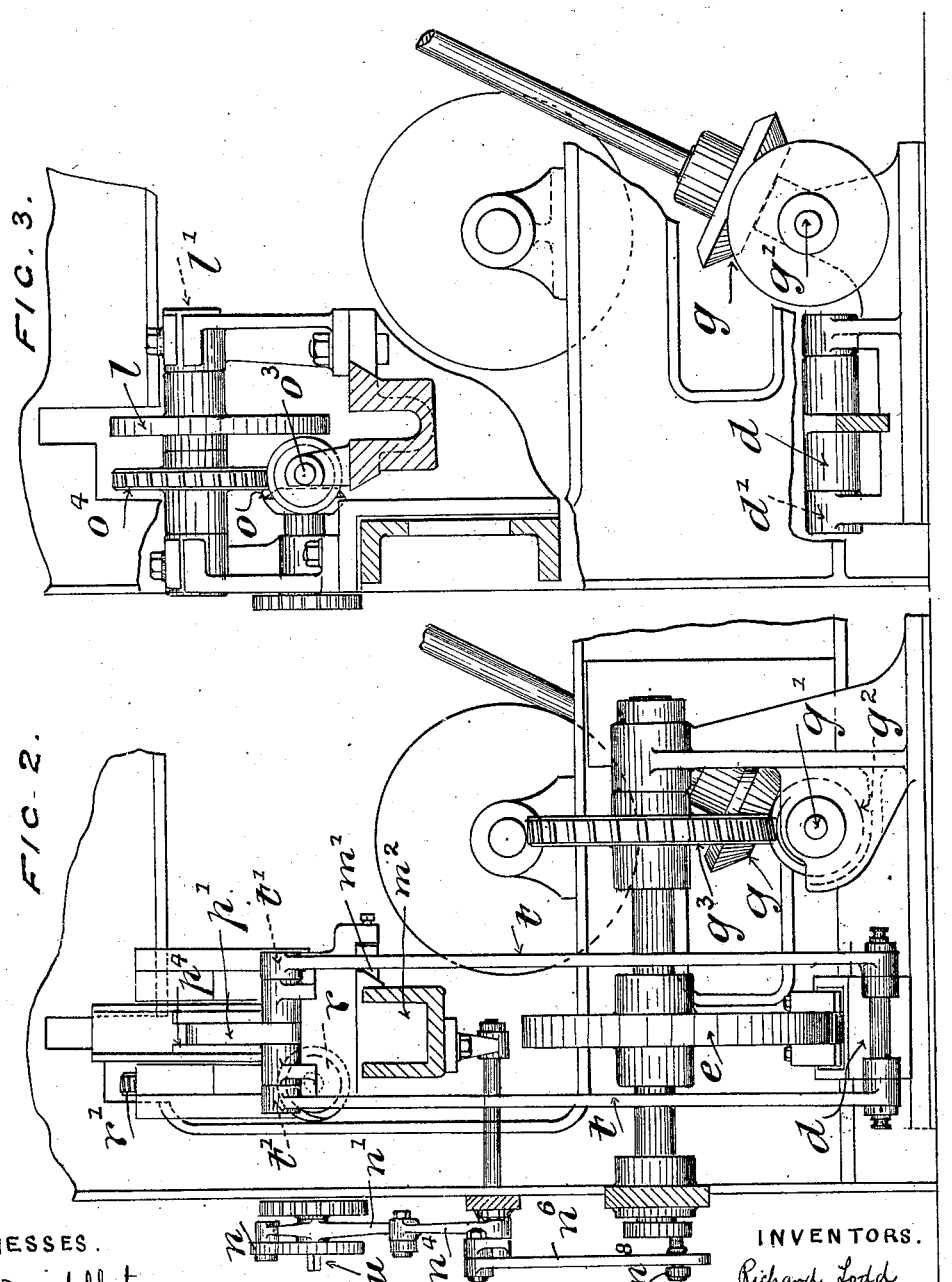

No. 842,921. PATENTED FEB. 5, 1907.
R. TODD & J. A. & A. H. STOTT.
MEANS FOR FACILITATING THE SPINNING OF TEXTILE FIBERS.
APPLICATION FILED FEB. 21, 1905.
7 SHEETS—SHEET 3.
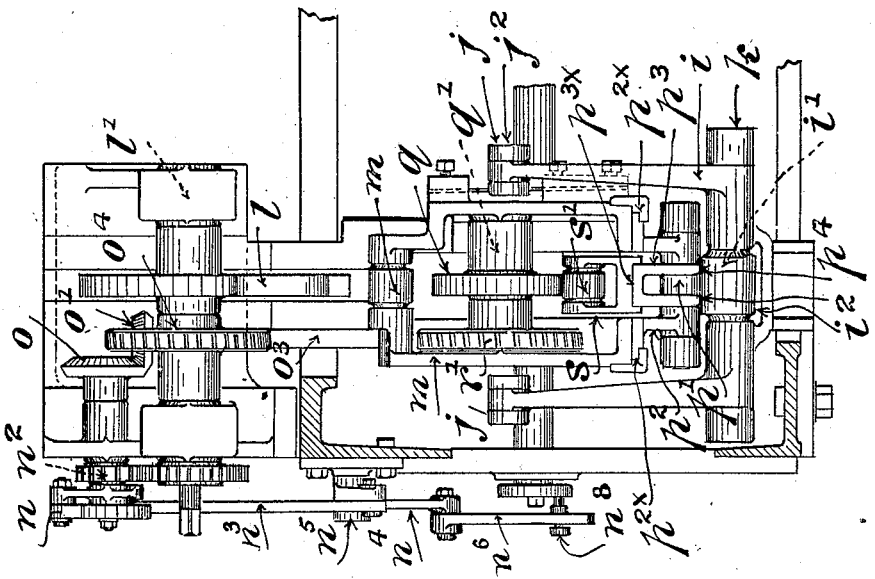
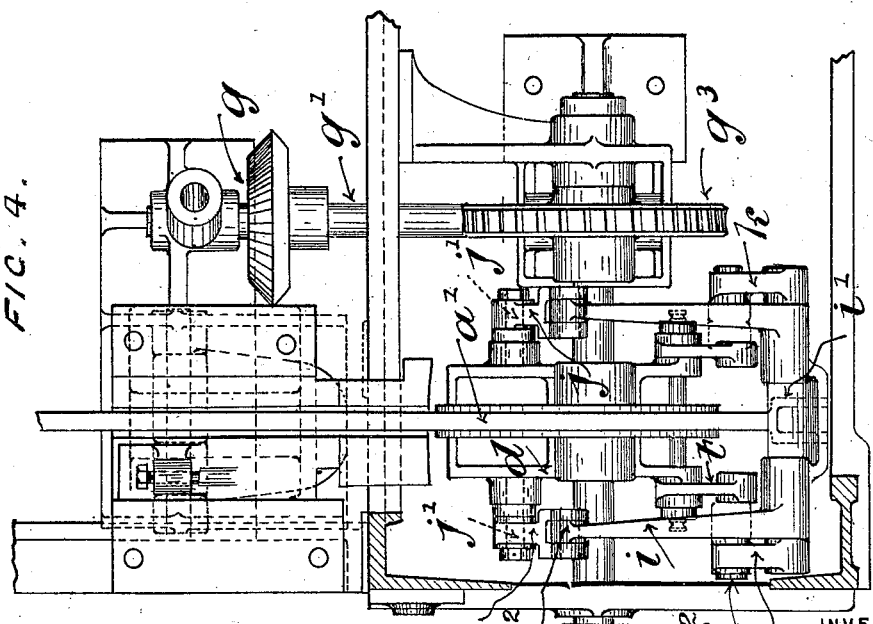
WITNESSES.
E. B. Middleton
Edward N. Sarton
INVENTORS
Richard Todd
Jesse Ainsworth Stott &
Abraham Hawthorn Stott
By their Attorneys Richard & Co.

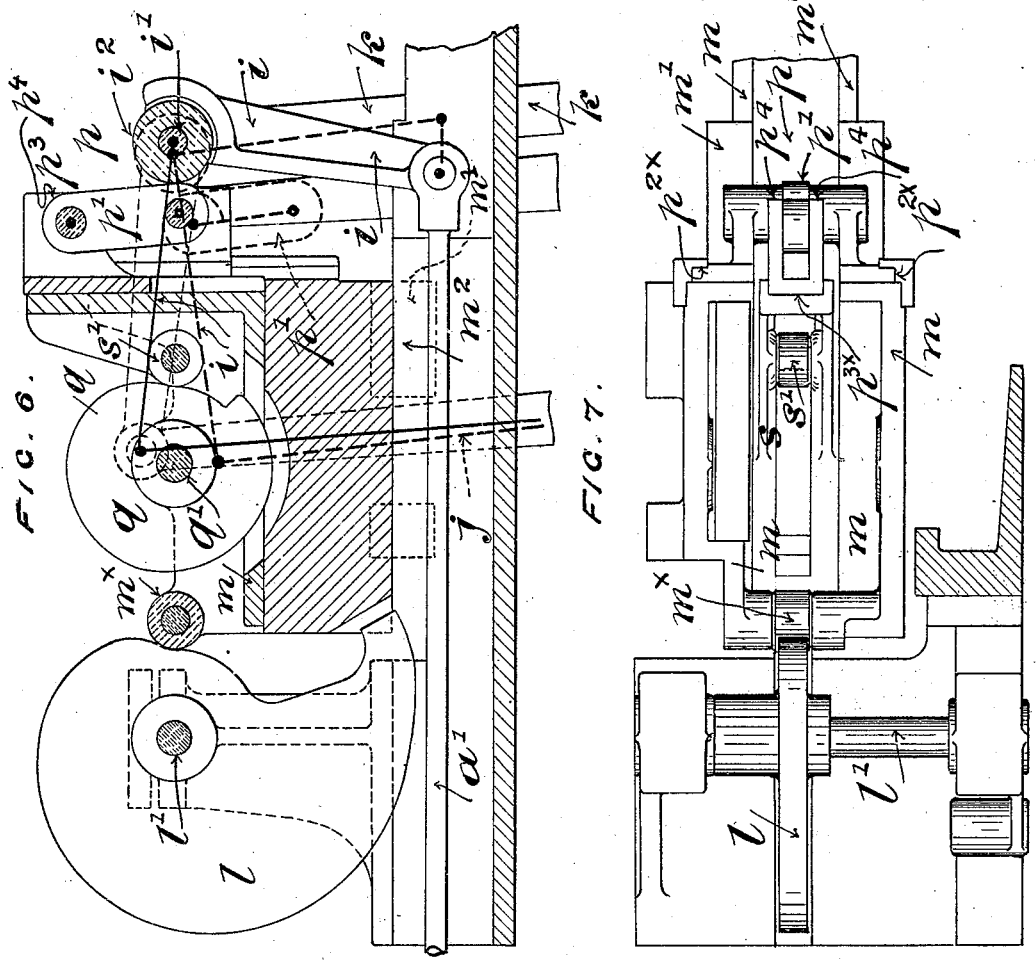

No. 842,921. PATENTED FEB. 5, 1907.
R. TODD & J. A. & A. H. STOTT.
MEANS FOR FACILITATING THE SPINNING OF TEXTILE FIBERS.
APPLICATION FILED FEB. 21, 1905.
7 SHEETS—SHEET 5.
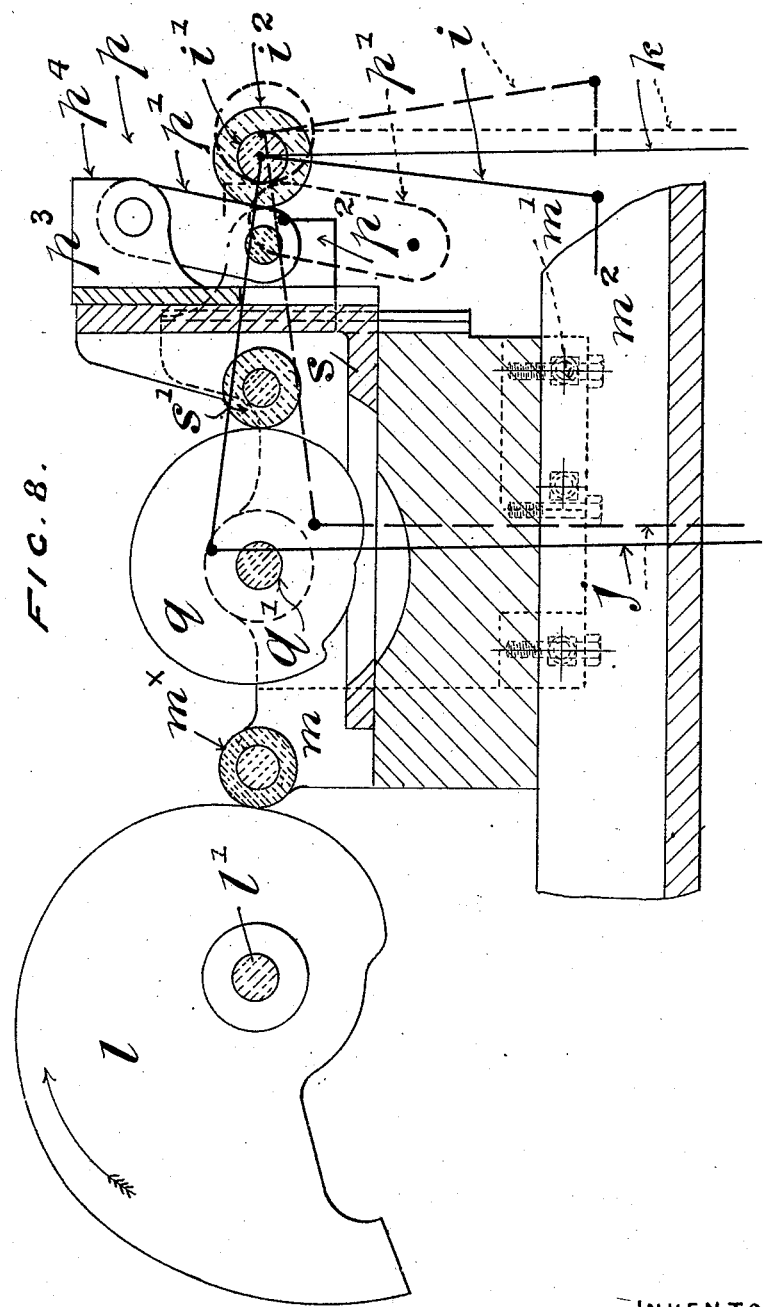
WITNESSES.
INVENTORS.

No. 842,921. PATENTED FEB. 5, 1907.
R. TODD & J. A. & A. H. STOTT.
MEANS FOR FACILITATING THE SPINNING OF TEXTILE FIBERS.
APPLICATION FILED FEB. 21, 1905.
7 SHEETS—SHEET 6.
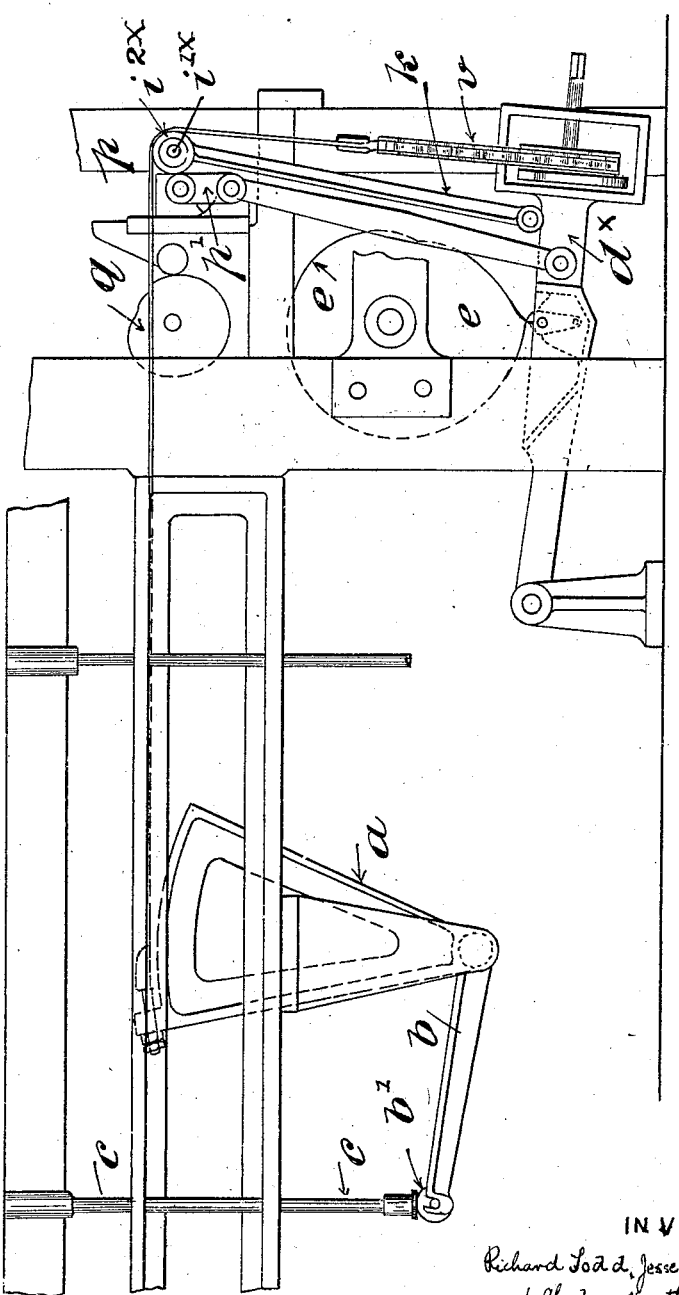
WITNESSES.
INVENTORS.

No. 842,921. PATENTED FEB. 5, 1907.
R. TODD & J. A. & A. H. STOTT.
MEANS FOR FACILITATING THE SPINNING OF TEXTILE FIBERS.
APPLICATION FILED FEB. 21, 1905.

7 SHEETS—SHEET 7.

WITNESSES.

INVENTORS.

UNITED STATES PATENT OFFICE.

RICHARD TODD, OF HEATON CHAPEL, AND JESSE AINSWORTH STOTT AND ABRAHAM HENTHORN STOTT, OF MANCHESTER, ENGLAND.

MEANS FOR FACILITATING THE SPINNING OF TEXTILE FIBERS.

No. 842,821.        Specification of Letters Patent.        Patented Feb. 5, 1907.

Application filed February 21, 1905. Serial No. 246,769.

*To all whom it may concern:*

Be it known that we, RICHARD TODD, residing at Heather Bank, Broomfield Road, Heaton Chapel, in the county of Lancaster, England, manufacturer, and JESSE AINSWORTH STOTT and ABRAHAM HENTHORN STOTT, both residing at 5 Cross street, Manchester, in the aforesaid county, architects and engineers, all subjects of the King of Great Britain and Ireland, have invented certain new and useful Improvements in Means for Facilitating the Spinning of Textile Fibers, (for which we have made an application for patent in Great Britain, No. 5,159, dated March 2, 1904,) of which the following is a specification.

This invention relates to frames of the throstle type, and particularly to spinning-frames for spinning on the bare spindle of the ordinary diameter. According to our present invention we propose to employ a different method of building the cops in such frames with a view to producing cops which in build are a very close approximation to mule-cops; and our invention consequently further relates to means for accomplishing our object.

In the specifications of inventions for which United States Letters Patents Nos. 603,068, 614,145, 624,132, and 624,266 have from time to time been granted to two of us it has been assumed that the rising and falling rails are operated in the well-known manner usual in ring-spinning frames, wherein the building of the yarn upon the bobbin or pirn is accomplished by a pawl and ratchet rotating through gearing a bowl in the head of the lever, which operates the rising and falling of the rails, the rotation of the bowl winding a chain on itself, so that each successive rise and fall of the rail takes place higher up the spindles until the building process is complete.

In building a cop on the bare spindle in order to make it firm enough to stand conditioning, packing, and carrying it is essential for it to have a differential chase like a mule-cop. As soon or directly after the cop-bottom is formed the chase should be at its longest and should thereafter gradually diminish or shorten until the completion of the cop. The formation of the said differential chase is of too complex a nature to be satisfactorily performed by the means hitherto used for operating the rising and falling rails, and if performed at all the quick drop at the top of the chase (described in United States Patent No. 624,266) is lengthened in proportion to the length of the chase. It is important that this drop at the top of the cop should be as long as the speed of the yarn coming from the rollers will permit without injuring the yarn. Therefore when the chase is at a greater length the drop is too long and causes breakages in the yarn.

It is the object of our invention to overcome the aforesaid difficulties and, as before explained, to produce cops having a differential chase like a mule-cop and with a constant quick drop of the yarn at the nose, and for this purpose we use the new motions for operating the rising and falling rails hereinafter described.

To assist in the clear explanation of our invention, we have attached hereto seven sheets of drawings, the figures of which we will first particularize.

In the said drawings, Figure 1 is a front elevation of our new motion applied to the gearing end of a continuous-spinning frame, only so much of the frame being indicated as will enable us to sufficiently explain the application and working of the new motion. The rising and falling rails (of which one is illustrated in the figure) are shown fitted with curbing-sleeves and appurtenances in accordance with our former patents; but these form no part of the invention, and the actual spinning contrivances for effecting continuous spinning may vary because the present invention only touches the building. Fig. 2 is a sectional elevation of Fig. 1 taken on the line A B, certain of the levers being omitted. Fig. 3 shows a sectional elevation of Fig. 1 on the line C D. Fig. 4 is a plan view, but with the main sliding frame or moving carriage omitted, the view clearly showing one way of carrying the bell-crank lever. Fig. 5 is a further plan view, more particularly of the upper mechanism seen in Fig. 1, the parts being in the same position as represented in that figure. Fig. 6 is an enlarged detail view of the building-cam, differential cam, and chase-slides with bell-crank lever and shows the parts in position when the minimum chase results. Fig. 7 is a detail plan view of the various slides on the main sliding or moving frame or carriage and shows very clearly one way of mounting and adjusting the secondary slide. Fig. 8 is an enlarged view of a like nature to Fig. 6, but shows the parts disposed so as to give the maximum chase. The figure also shows means for adjusting the main sliding or moving carriage. Fig. 9 shows a modification. Fig. 10 shows another modification.

The figures up to number 8 in the drawings very fully and clearly show one suitable form of parts our new motions may take, and we will now proceed to give a full explanation of the construction and working of the motions.

In the drawings, $a$ represents the usual or any suitable quadrant actuating the movable pokers $c$ in the ordinary and well-known manner through the usual rods $a^3$, levers, and rocking shafts (not shown) and levers $b$ with antifriction-bowls $b'$; but the movement of the quadrant is no longer controlled as heretofore, but by our new motions. We use a lever $d$, centered at $d'$, and which lever we will call the "copping-lever," said copping-lever being actuated by a suitably-shaped copping-cam $e$, the copping-lever being held in contact with the copping-cam by means of a convenient form of spring, such as the spring $f$, anchored at $f'$ and attached to the copping-cam lever at $f^2$. The copping-lever $d$ and copping-cam $e$ comprise an arrangement for giving a quick initial drop at the top of the chase, the same as or similar to that described in United States Patent No. 624,266. To actuate the cam-shaft, we may use bevel-gear $g$, driven from the end gearing, the bevel-gear communicating motion to the shaft $g'$, which carries a worm $g^2$, gearing into a worm-wheel $g^3$ on the cam-shaft, although the cam-shaft may be actuated in any other convenient manner.

To return to the copping-lever $d$, the raising of the rails $h$ is accomplished and their falling controlled by said copping-lever, which is arranged to act on connected bell-crank lever $i$, hereinafter referred to as the "bell-crank lever," said bell-crank lever being centered at $i'$ on levers or arms $k$, pivoted to a bracket $k'$ or to the frame at the points $k^2$. The bell-crank lever preferably carries an antifriction-bowl $i^2$. The movement from the copping-lever $d$ is conveyed to the bell-crank lever $i$ by connecting-rods $j$, centered on the copping-lever at $j'$ and jointed to the bell-crank lever at $j^2$. It will thus be seen that as the copping-cam revolves the movement of the copping-lever communicated through the rods $j$ exercises a reverse action on the bell-crank lever $i$, alternately pulling and permitting the return of the end connected to the rod $j$. The movement imparted to the bell-crank lever is transmitted to the quadrant, and so each rail is raised and lowered, the result of the mechanism so far described being a copping motion governed by the shape of the copping-cam. Any suitable form of connection between the bell-crank-lever end and the quadrant may be used, and in the drawings we have shown a longitudinal rod $a'$ and a strap $a^2$.

The building of the cops is effected by imparting movement to the center or fulcrum $i'$ of the bell-crank lever $i$, and this movement of the fulcrum $i'$ can be conveniently performed by a cam. This cam, which we will call the "building-cam," is marked $l$ and is mounted on a shaft $l'$ and when revolved acts on the antifriction-bowl $m^\times$ of a sliding or movable frame or carriage, such as $m$, which in the drawings is formed with a slide $m'$ at its base and is capable of endwise movement on a bed or support $m^2$. The bed or support and slide and the means of adjustment are clearly shown in Figs. 2, 7, and 8. The action of the building-cam $l$ on the sliding or movable frame or carriage $m$ from start to finish is to push the frame or carriage $m$ to the right, as in Fig. 1, and so shift the fulcrum $l'$ of the bell-crank lever $i$. This gradual shifting of the fulcrum or center $i'$ causes each successive rise and fall of the rails to take place higher up the spindles a distance governed by the contour of the building-cam $l$, as will be obvious and this distance can easily be varied or regulated by varying the contour of the building-cam so as to produce the desired shape of cop. The action of the building-cam $l$ on the sliding or movable frame or carriage and the construction of the latter will be fully appreciated by an inspection of the enlarged views, Figs. 6, 7, and 8. Fig. 6 shows the building-cam in its starting position and before it has begun to influence the frame or carriage, while Fig. 8 indicates the position of the building-cam and the sliding carriage when building is proceeding with the longest chase. The building-cam $l$ is rotated at a slow speed by any suitable form of mechanism—as, for instance, we may use ratchet mechanism. This is the form of mechanism we have chosen for illustration in the drawings, wherein $n$ is the ratchet-pawl, carried on an oscillating lever $n'$, centered at $n^2$, said lever being coupled by a connecting-rod $n^3$ to a bell-crank lever $n^4$, pivoted at $n^5$. To the bell-crank lever $n^4$ a link $n^6$ is attached, having a slotted extremity $n^7$, in which a crank-pin $n^8$ plays, so that as said crank-pin revolves with the cam-shaft the pawl $n$ is intermittently actuated, as will be clearly followed. The ratchet-spindle carries a bevel-pinion $o$, which meshes with a bevel-pinion $o'$, compounded with a worm $o^2$ on the shaft $o^3$, said worm $o^2$ driving a worm-wheel $o^4$, secured to the building-cam shaft $l'$.

The action of the foregoing mechanism described in detail would produce a cop with a uniform chase; but in order to make a good cop-bottom and a firm cop it is necessary to produce a differential chase, which as before stated, is the great object of our invention, and with this purpose in view we do not allow the center of fulcrum $i'$ of the bell-crank lever $i$ to bear directly on the end of the sliding or moving frame or carriage, but on a device which we will call a "differential-chase plate" $p$, which we will deal with later, and we influence such differential-chase plate by means of a third cam $q$, hereinafter referred to as the "differential-chase cam." This differential-chase cam $q$ is mounted on a shaft $q'$ in the sliding or moving frame or carriage $m$, said differential-chase cam being designed and used to impart angular movement to the differential chase-plate $p$, so as to allow the latter to influence the bell-crank fulcrum independently of the movement of the sliding or moving frame or carriage $m$. The differential-chase cam is conveniently rotated by any known mechanism—as, for instance, it may be driven through worm-gear, the worm $r$ gearing into a worm-wheel $r'$ on the shaft $o$, said worm sliding on a squared portion of the shaft, as clearly seen in Fig. 1, so that driving connection is maintained as the sliding frame or carriage $m$ is moved. Turning now to the differential-chase plate, which lies intermediate of the sliding or moving frame or carriage $m$ and bell-crank-lever fulcrum $i'$, it will be clearly seen from Figs. 1, 6, 7, and 8 that such device (lettered $p$ as a whole) combines a link $p'$ and two distinct slides $p^2$ $p^3$. These distinct slides are formed with parts which engage planed or other ways, the slide $p^2$ moving in ways or grooves $p^{2\times}$, formed on the sliding or moving frame or carriage $m$, while the slide $p^3$ moves in a groove or way $p^{3\times}$, formed in a second carriage $s$. This second carriage $s$ is movable upon the main sliding frame or carriage $m$, as is clearly illustrated in Figs. 4, 6, 7, and 8, the second carriage $s$ having an antifriction-bowl $s'$ and being acted upon by the differential-chase cam $q$. It is thus seen that the lower slide $p^2$ partakes only of the horizontal movement due to the action of the building-cam on the main sliding frame or carriage $m$, while the upper slide $p^3$ not only partakes of this movement, but also of the movement due to the action of the differential-chase cam $q$, whereby it follows that the differential-chase plate or so much of it as is requisite—that is to say, the link $p'$—can as required be angularly disposed.

In order to exercise its desired function, the differential-chase plate as a whole, including distinct slides $p^2$, $p^3$, and link $p'$, must be reciprocated, and this we at present accomplish by connecting-rods, such as $t$, jointed to the chase-slide $p^2$ at $t'$ and to the copping-lever $d$. When the two slides $p^2$ $p^3$ are in the same plane or when the differential-chase plate $p$ as a whole presents a vertical face to the fulcrum of the bell-crank lever, then the length of chase is unaffected by the differential-chase cam. If the slide $p^3$ (which is the slide operated by the differential-chase cam $q$) lies behind the fixed slide $p^2$, then the length of chase is reduced proportionately by the slide leaning backward or to the left, as is clearly shown in Fig. 6, the reason for this being that as the slides are reciprocated the angular disposition of the link $p'$ shifts or influences the bell-crank fulcrum, and so curtails the quadrant action, correspondingly affecting the movement of the rails. Similarly, if the slide $p^3$, operated by the differential-chase cam, is forward from the fixed slide $p^2$ the length of the chase is proportionately increased by the link leaning forward or to the right, because the bell-crank fulcrum shifts inward as the slides are reciprocated.

The differential-chase cam $q$ (shown in the drawings) gradually lengthens the chase from a minimum to a maximum and when or shortly after the cop-bottom is fully formed allows the chase to gradually diminish. By varying the shape of the cam the length of chase at any point can be regulated, as will be understood.

The action of the differential-chase plate $p$ upon reciprocation of the slides and its effect upon the bell-crank-lever fulcrum is clearly diagrammatized in Figs. 6 and 8. In these figures the angularity of the link $p'$ in Fig. 6 gives a minimum chase, while in Fig. 8 the angularity is such as to give a maximum chase, as has been before mentioned.

To prevent the length of the initial quick drop, due to the action of the copping lever and cam shown and which takes place from the top of the chase, being lengthened or shortened along with the lengthening or shortening of the chase, we arrange that the bell-crank-lever fulcrum shall prior to and during such initial quick drop bear on and move on a face which is at right angles or thereabout to the horizontal direction of movement of the bell-crank-lever fulcrum. A simple way of effecting this object is to form the slide $p^3$ with short vertical faces $p^4$, upon which the bowl $i^2$ bears prior to and during the initial quick drop. This initial quick drop may, for example, be about one-fourth of an inch; but whatever the length of drop it is preferably maintained throughout the building of the cop. With regard to this quick drop sufficient has been said to show that during the movement of the portion $p^4$ of the slide-plate $p$ the chase is unaffected by the action of the differential-chase cam and is controlled solely by the copping-cam, and thus we insure that the quick drop shall be the same whatever the length of the chase may be.

Having indicated the details of construction, we may briefly describe the operation of the mechanism in the building of a set of cops. In commencing a set of cops the sliding frame or carriage $m$ is set in to the fullest extent and the building-cam $l$ is in its starting position bearing on the end of the sliding frame or carriage. The differential chase-cam $q$ is also at its starting position. (See Fig. 6.) When spinning is commenced, the link $p'$ of the differential-chase plate leans inward to the left, and the lift or rise and fall in the absence of the differential chase-plate $p$ would be that due to the action of the copping-cam; but on the reciprocation of the slides $p^2$ $p^3$ the action of the copping-cam is minimized by the inclined link of the differential-chase plate, which deflects the bell-crank-lever fulcrum after the initial drop, thus giving the shortest chase, which shortest chase is employed in commencing the cop-bottom. As the building proceeds the building-cam and differential-chase cam are revolved, the first slowly raising the rails at intervals by its action on the sliding or moving frame or carriage $m$, while the second gradually shifts the movable slide $p^3$ until both slides are in the same plane. At this stage the chase is that due to the copping-cam and copping-lever only; but with continued rotation of the differential-chase cam this cam gradually pushes forward the movable slide $p^3$ until the same leans over to the right. The consequence of this is that the starting-point for the top of the chase is gradually more rapidly raised than the building-lift is performed, because the lower slide moves only with the main carriage, while the slide $p^3$ has an independent movement, the advance of the slide $p^3$ causing the requisite angular disposition of the link. The position of the parts at this stage is such that on reciprocation of the slides $p^2$ $p^3$ (although the fulcrum of the bell-crank levers is at first influenced to raise the starting-point) the fulcrum thereafter moves in, owing to the inclination of the link, this inward movement of the fulcrum minimizing the action of the quadrant at such time. The position of the parts at this stage is clearly shown in Fig. 8, the cop-bottom being now fully formed and the chase at its longest. By the time that stage in the building of the cop is reached when it is desirable to commence to gradually shorten the chase the differential-chase cam has revolved to a position where its contour allows the slide $p^3$ to gradually recede, and the slide moves back, allowing the link $p'$ to gradually assume a vertical position or a position beyond that, and this movement, as will be now understood, has the effect of gradually shortening the chase. This gradual shortening of the chase continues until the cop is completed.

The reader will see that the use of what we term the "differential-chase plate," having the slides $p^2$ $p^3$ suitably influenced by actuating parts, enables us to gradually and automatically add to or subtract from the length of the chase in the required degree for the form of cop it is desired to produce.

As the building of the cop proceeds the initial quick drop occurs when the bell-crank-lever fulcrum is on the vertical faces $p^4$ and before it is influenced by the inclination of the link, and thus the initial quick drop is always the same. This quick drop is of the utmost importance in producing good cops, and we regard the provision of means for insuring a uniform quick drop, no matter what the length of chase may be, as an important feature of our invention.

For resetting the building and differential-chase cams we have shown a form of quick-return motion $u$ in Figs. 1, 2, 3, and 4; but as this is no part of our invention we need not describe it in detail.

The motion or movements of the bell-crank lever may be communicated to the pokers in any other known or approved manner.

We have described in their complete form our motions for building a cop on continuous-spinning frames as we prefer to apply them; but we will now indicate two modifications thereof wherein more of the usual and well-known motions used in ordinary continuous-spinning frames are retained.

In the one modification shown in diagrammatic form in Fig. 9 the building of the cop is still performed in the ordinary and well-known manner by the winding of a chain or band $v$ on a bowl in the head of the copping-lever, which is marked $d^\times$ in this figure, such chain or band being connected to the quadrant $a$ after passing over a bowl or bowls $i^{2\times}$, oscillating on a center—as, for instance, said bowl or bowls may be carried by levers, such as the levers $k$. With this modified form of mechanism the differential chase combined with the constant quick drop at the nose of the cop is obtained by using our reciprocating differential-chase plate $p$, actuated by our differential-chase cam $q$ to increase and decrease the lift of the rails by moving the center on which the bowls oscillate in a similar manner to that in which it moves the fulcrum of the bell-crank lever, as previously described. It will of course be obvious that in this case the building-cam $l$ and sliding carriage $m$ are dispensed with, while the arrangements for mounting the movable carriage for the differential-chase plate are suitably modified for the altered conditions.

In another modification, which is illustrated by diagram in Fig. 10, Sheet 11, the copping-lever $d^\times$ may actuate the quadrant by means of a chain or band $w$ passing over a bowl or bowls $i^{2\times}$, oscillating on a center, such as $i'^\times$, carried, say, by the lever $k$, and the building of the cop, as well as the differential chase, combined with the constant drop at the nose of the cop, may be obtained by moving the center $i'^\times$, on which the bowl or bowls $i^{2\times}$ oscillate, and this by means of the building-cam $l$ and the differential-chase plate $p$, actuated by the differential-chase cam $q$ in a manner similar to that in which said cams move the fulcrum of the bell-crank lever previously described.

Although we have shown and described our improvements in connection with a frame of the class described in former patents of our own, it must be understood that the method and means of building cops having a differential chase may be used in connection with other continuous-spinning frames for spinning on the bare spindle or otherwise.

We declare that what we claim is—

1. In continuous-spinning frames, and for the indicated purpose, a chase-plate, slides for said chase-plate, reciprocating mechanism for said slides and chase-plate, automatic means for varying the angle of the chase-plate and means for insuring the same initial quick drop being imparted no matter what the length of the chase, substantially as described.

2. The chase-varying mechanism comprising slides $p^2$, $p^3$, and link $p'$ connecting said slides, means for varying the angle of inclination of the part $p'$ supporting means for the connected slides, means for reciprocating said chase-varying mechanism, the slide $p^3$ having a right-angled face $p^4$ for insuring the same initial quick drop, substantially as described.

3. In mechanism for the indicated purpose, a copping-lever, a building-cam, mechanism for actuating such building-cam, a sliding or movable carriage actuated thereby, a differential-chase cam, a chase-varying device comprising slides slide-guides, and means for reciprocating the slide-guides, relative to the carriage, connections between the rail and the copping-lever including a shiftable bell-crank lever, said chase-varying device influencing the fulcrum of said bell-crank lever as building proceeds, substantially as described.

4. In combination, a copping-lever, a copping-cam, a shiftable bell-crank lever, supports for said bell-crank lever, connections between the bell-crank lever and copping-lever between the bell-crank lever and lifting-rail, a chase-plate engaging the fulcrum of the bell-crank lever, connected slides reciprocated from said copping-lever, independent movable guides or supports for said slides, means for moving the guides or supports including, a differential-chase cam, and a building-cam, substantially as described.

5. The building motion for producing cops with a differential chase and a constant initial quick drop, comprising a copping-cam, a shiftable bell-crank lever, a chase-varying device means for insuring a uniform quick drop, reciprocating mechanism intermediate of said chase-varying device and copping-lever, movable carriages or supports, and a building-cam, all substantially as described.

6. In combination in continuous-spinning frames for producing cops of the indicated kind, a copping-cam, a copping-lever, building mechanism in connection with said copping-lever, a chase-varying device, reciprocating mechanism intermediate of said chase-varying device and copping-lever, a movable support for said chase-varying device, and a differential-chase cam for said chase-varying device, and means for rotating said cam, substantially as described.

7. In combination in continuous-spinning frames, for producing cops of the indicated kind, a copping-lever, a copping-cam coöperating therewith, a quadrant mechanism for moving the rails, intermediate connections between the quadrant and copping-lever including a shiftable fulcrum, a chase-varying device acting on said fulcrum and suitably-guided means for reciprocating said chase-varying device, a differential-chase cam and a support therefor and a building-cam acting on said support substantially as shown.

In testimony whereof we have signed our names to this specification in the presence of two subscribing witnesses.

RICHARD TODD.
JESSE AINSWORTH STOTT.
ABRAHAM HENTHORN STOTT.

Witnesses:
RICHARD IBBERSON,
ALFRED YATES.